June 28, 1966  W. H. SCIDMORE ETAL  3,257,904
NIGHT AND DAY PERISCOPE
Filed March 2, 1965  2 Sheets-Sheet 2
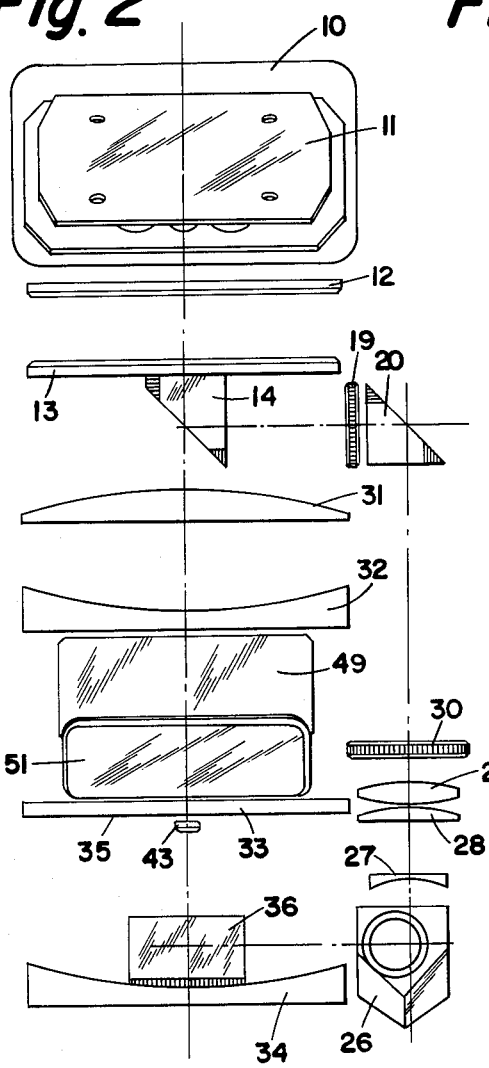
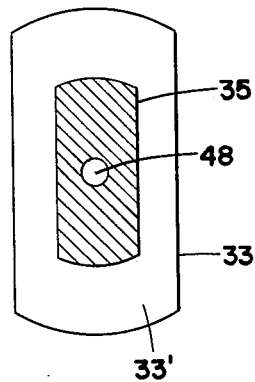
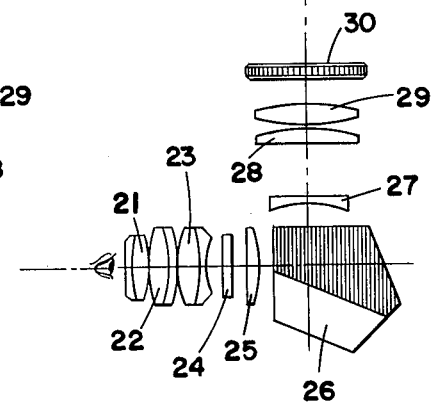
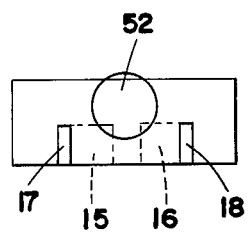
INVENTORS.
WRIGHT H. SCIDMORE
JAMES W. SHEAN
BY: *Harry M. Saragovitz,*
*Edward J. Kelly,*
*Herbert Berl & H. Dubroff*
ATTORNEYS.

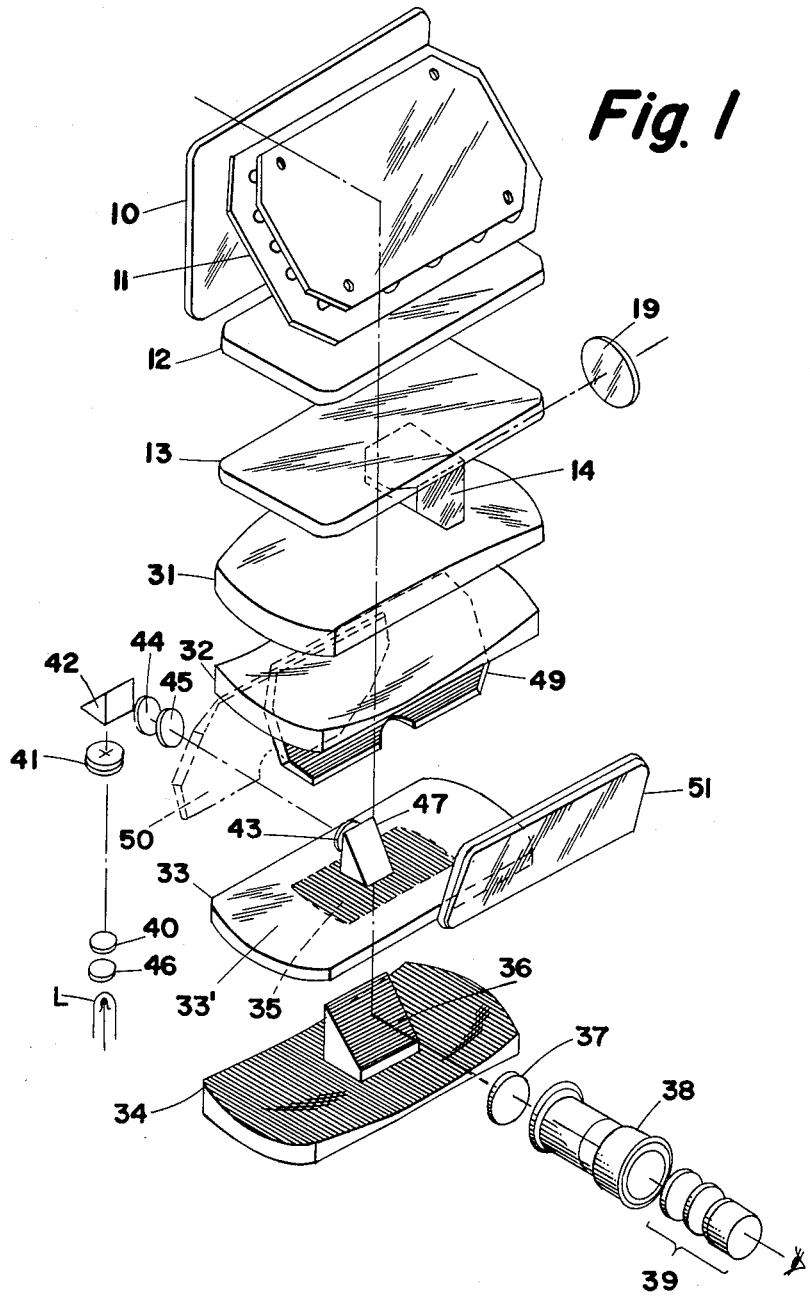

3,257,904
NIGHT AND DAY PERISCOPE
Wright H. Scidmore, Langhorne, and James W. Shean, Levittown, Pa., assignors to the United States of America as represented by the Secretary of the Army
Filed Mar. 2, 1965, Ser. No. 436,702
1 Claim. (Cl. 88—72)

The invention described herein may be manufactured and used by or for the Government for governmental purposes without the payment to us of any royalty thereon.

This invention is a continuation-in-part of our co-pending patent application, Serial Number 231,304, filed October 17, 1962, now abandoned, entitled, "Periscope," and relates to periscopes which are utilized in tanks or under other conditions where widely different levels of illumination are encountered. It combines in a compact and rugged structure a periscope with high-power night-and-day sighting capability and with means for unaided binocular vision, the periscope using but a single entrance window.

This highly desirable result is accomplished by collecting a relatively large bundle of light through a common entrance port, funneling a small portion of this light into a high power day channel and directing the remainder of this light into either a high power night channel or into a unit power surveillance channel. The high power day channel is completed by a telescope which is mounted on the periscope and receives light therefrom through a window and a prism. Selection between the high power night channel and the unity power surveillance channel is effected by means of a mirror which is pivoted to be moved into and out of the path of the light beam.

The invention will be better understood from the following description when considered in connection with the accompanying drawings and its scope is indicated by the appended claims.

Referring to the drawings:

FIG. 1 illustrates a diagrammatic view of the optical system of our periscope.

FIG. 2 illustrates the optical system as viewed from the position of the operator, the image converter tube and its associated optics being omitted.

FIG. 3 illustrates the relation between the periscopic and telescopic portions of our device.

FIG. 4 is an explanatory diagram illustrating a typical unit power field presentation of the periscope.

FIG. 5 is a plan view of a window-mirror which forms a part of our optical system.

The optical system of FIGS. 1 and 2 includes a sealed removable periscope head assembly comprising an entrance window 10 which admits light from object space to a head mirror 11 from whence it is reflected through an exit window 12. Light rays passing through exit window 12 enter the periscope body which comprises an entrance window 13, a 90° prism 14, window 19, corrector lenses 31 and 32, a pivotable mirror 49 which may be swung into operable position as shown at 49 or out of operable position as indicated at 50, a unity power window 51, window mirror 33, primary objective mirror 34, 90° mirror 36, lens projector 43 and 90° prism 47.

Prism 14 passes a part of the light from window 13 to a portion of the high power day channel hereinafter described, the prism being located toward the observer of the instrument center line as shown in FIG. 1, and thus providing an uncluttered presentation of the more significant portion of the unit power field. It appears in the lower portion of the unit power field as two transparent shadows 15 and 16 (FIG. 4) in the central area of the field normally seen binocularly and as two small opaque posts 17 and 18 at the outer extremities of these shadows in the outer portion of the field which is normally seen only by the right or left eye. The effect of this vignetting and obscuration is not objectionable due to its location in the lower position of the field and does provide a crude reference as to the location of the high power fields. Objects partially obscured by the prism can be seen by a slight shift of the head. The circle 52 shown in FIG. 4 represents the field of view of the high-power telescope and is shown for reference.

Light reflected from prism 14 passes through window 19, to 90° prism 20 (FIG. 2) from which it is directed into an elbow telescope which is mounted on the periscope and completes the high power day channel. As indicated in FIG. 3, this telescope includes an eye lens 21, a center lens 22, a field lens 23, a reticle 24, a field lens 25, a penta roof prism 26, objective lenses 27, 28 and 29 and a window 30. This telescope provides high power sighting capability in the daytime without increasing the width, and hence the vulnerability, of the head assembly. Inherent stability for the retention of boresight and sighting accuracy under extreme environmental conditions is attained by the fixed mounting of the prism 14 instead of using a moving element such as a flip mirror, for example, to channel light into the high power day channel. Thus, the high power day channel consists of the periscope head assembly, telescope, and body window 13, prism 14, window 19 and prism 20.

Light rays contributing to the image for night observation are transmitted through exit window 13, except for those rays entering prism 14, through corrector lenses 31 and 32 and an outer area 33' of window-mirror 33 to primary objective mirror 34. The mirror 34 folds the optical path back so that the light impinges on and is reflected from the reflecting surface 35 of window-mirror 33. From the surface 35, the light is directed to a 90° mirror 36 having its upper slanted surface aluminized from which the light passes to a field-flattener lens 37 and is focused at the light sensitive surface of an image converter tube 38. The visible image formed on the screen of the image converter tube is magnified and focused at infinity by the eyepiece assembly 39 which is provided with plus or minus 4 diopters of adjustment for comfortable viewing. Thus, the high power night channel consists of the periscope head assembly, body window 13, corrector lenses 31 and 32, window-mirror 33, objective-mirror 34, reflecting surface 35, 90° mirror 36, field flattener lens 37, image converter tube 38 and eyepiece assembly 39.

Light from a reticle 40, illuminated from a source L through a diffusion plate 46, is collimated by a lens 41, deviated 90 degrees by a prism 42 and passed through windows 44 and 45 all of which comprises the reticle projector assembly used in the high power night channel, into a cemented doublet lens 43. Lens 43 converges this light to a focus at the light sensitive surface of the image converter tube 38 after being deviated 90 degrees along the optical axis of the system by a prism 47. Lens 43, which is identical to lens 41, has a plane rear surface to permit it to be cemented to the prism 47. This prism is cemented to the window-mirror 33 at its reflective portion 35. Either a central hole 48 (FIG. 5) in the window-mirror or an equivalent clear area in the mirror patch 35 is required to combine the field and reticle presentations.

Unaided, binocular vision can be provided, at the expense of a considerable reduction in light gathering power and hence efficiency of the high-power night sight, by interposing a mirror 49 into the optical path, as shown at 49. This mirror is pivoted by well-known means for movement into and out of the optical path. In its operable position, it reflects light through a unity power window 51 for direct viewing of object space. The unity power mirror 49-50 is located to the front of the instrument center line to provide an uncluttered presentation of the more significant portion of the unit power field. The unity power surveillance channel thus comprises the periscope head assembly, body window 13, corrector lenses 31 and 32, unity power mirror 49-50 and unity power window 51.

Two similar "rectangularly" shaped corrector positive lens 31 and negative lens 32 provide a maximum aperture of 6.375 inches and are foreshortened symmetrically in the front and rear to an aperture of 3.0 inches giving rise to the "rectangular" shape, as shown in FIG. 5. The edge thickness around the circular portions of these lenses is constant. The plane rear surfaces, together with the area of constant thickness, facilitates mounting of these components, assuring retention of collimation under extreme environmental conditions. The dioptric power of the combination of these two corrector lenses is approximately minus ⅛ diopter thus requiring a small, acceptable amount of eye accommodation when using the unit power vision system.

Suitable characteristics for the various components of our optical system are tabulated below:

*Objective system*

| Component | Radius, In. | Thickness, In. | Glass Type |
|---|---|---|---|
| Corrector Lens (31): | | | |
| Entrance Surface | 14.455 | .650 | 526-546 |
| Exit Surface | ∞ | (1.500) | air |
| Corrector Lens (32): | | | |
| Entrance Surface | −12.067 | .312 | 511-635 |
| Exit Surface | ∞ | (3.449) | air |
| Window-Mirror (33): | | | |
| Entrance Surface | ∞ | .312 | 523-586 |
| Exit Surface | ∞ | (3.460) | air |
| Objective Mirror (34) | −16.000 | (8.108) | air |
| Lens (37): | | | |
| Entrance Surface | −2.100 | .100 | 720-293 |
| Exit Surface | 4.297 | (.005) | air |
| Tube Window (38): | | | |
| Entrance Surface | 2.380 | .065 | 523-586 |
| Exit Surface | 2.380 | | |

*Reticle projector system*

| Component | Radius, In. | Thickness, In. | Glass Type |
|---|---|---|---|
| Reticle (40): | | | |
| Entrance Surface | ∞ | .100 | 584-460 |
| Exit Surface | ∞ | (5.724) | air |
| Lens (41): | | | |
| Entrance Surface | 2.158 | .074 | 720-293 |
| Intermediate Surface | 1.212 | .127 | 523-586 |
| Exit Surface | ∞ | (.500) | air |
| Prism (42): | | | |
| Entrance Surface | ∞ | .600 | 517-645 |
| Exit Surface | ∞ | (2.030) | air |
| Lens (43): | | | |
| Entrance Surface | 2.158 | .074 | 720-293 |
| Intermediate Surface | 1.212 | .127 | 523-586 |
| Exit Surface | ∞ | Cemented to prism 47 | |
| Prism (47): | | | |
| Entrance Surface | ∞ | .800 | 523-586 |
| Exit Surface | ∞ | (4.960) | air |
| Lens (37): | | | |
| Entrance Surface | −2.100 | .100 | 720-293 |
| Exit Surface | 4.297 | (.005) | air |
| Tube Window (38): | | | |
| Entrance Surface | 2.380 | .065 | 523-586 |
| Exit Surface | 2.380 | | |

With certain exceptions hereinafter described, numbers in parentheses indicate the magnitude of the air space between that exit surface and the entrance surface of the optical element accepting the light rays therefrom. For example, the distance between the exit or bottom surface of corrector lens 31 and the upper or entrance surface to corrector lens 32 is 1.500 inches. However, the distance shown of 3.449 inches (exit surface of corrector lens 32) is measured between the upper surface of window-mirror 33, and not prism 43, and the exit surface of lens 32. The distance of 8.108 inches (objective mirror 34) is measured from the reflecting surface of objective-minor 34 to the reflecting (lower) surface of window-mirror 33 back to the reflecting surface of 90° mirror 36, to the entrance surface of lens 37. There is no air space between the exit surface of doublet lens 53 and prism 47 as both are cemented together.

Values for the telescopic elements 21 to 30 inclusive and diffusion plate 46 of the reticle projector assembly are not herein presented as conventional values may be assigned thereto.

It is apparent from the foregoing description that we have provided a compact night and day periscope suitable for use with armored vehicles and the like comprising a high-power night-and-day channel as well as a unit power surveillance channel, each of the channels using a common entrance window.

We claim:

A periscope forming a high-power day channel, a high-power night channel and a unity power surveillance channel comprising:

a periscope head assembly for receiving light rays from object space, a window in said head assembly used by each of said channels, a periscope body for receiving said light rays transmitted through said periscope head assembly, said periscope body comprising a body window, an upper corrector lens and a lower corrector lens after said body window and axially aligned therewith, a window-mirror after said corrector lenses, said window-mirror having a generally centrally positioned reflective portion at the bottom thereof, said reflective portion having a central hole therethrough, a primary object mirror below said window-mirror for reflecting light rays transmitted through an outer portion of said window-mirror, means for projecting a reticle pattern into said periscope body comprising a source of light energy, a reticle for receiving said light energy, a lens for collimating said light energy after passing through said reticle, a 90° collimating prism for deviating said collimated light energy into said periscope body, a doublet lens cemented to a 90° prism disposed centrally atop said reflective portion of said window-mirror for ultimately directing said deviated light energy into an image converter tube assembly, said image tube converter assembly comprising a field flattener lens and an image converter tube thereafter having an eyepiece assembly whereby said projected reticle pattern and said light rays are simultaneously observed at said eyepiece assembly, means for unity power surveillance comprising a mirror pivotally mounted to said periscope body between said lower corrector lens and said window mirror for reflecting said light rays passing through said corrector lens into a unity power window when said pivotable mirror is in its operable position, said periscope having pertinent component characteristics as follows:

*Objective system*

| Component | Radius, In. | Thickness, In. | Glass Type |
|---|---|---|---|
| Corrector Lens (upper): | | | |
|   Entrance Surface | 14.455 | .650 | 526-546 |
|   Exit Surface | ∞ | (1.500) | air |
| Corrector Lens (lower): | | | |
|   Entrance Surface | −12.067 | .312 | 511-635 |
|   Exit Surface | ∞ | (3.449) | air |
| Window-Mirror: | | | |
|   Entrance Surface | ∞ | .312 | 523-586 |
|   Exit Surface | ∞ | (3.460) | air |
| Objective Mirror (Primary) | −16.000 | (8.108) | air |
| Lens (Field Flattener): | | | |
|   Entrance Surface | −2.100 | .100 | 720-293 |
|   Exit Surface | 4.297 | (.005) | air |
| Tube Window (Image Converter): | | | |
|   Entrance Surface | 2.380 | .065 | 523-586 |
|   Exit Surface | 2.380 | | |

*Reticle projector system*

| Component | Radius, In. | Thickness, In. | Glass Type |
|---|---|---|---|
| Reticle: | | | |
|   Entrance Surface | ∞ | .100 | 584-460 |
|   Exit Surface | ∞ | (5.724) | air |
| Lens (Collimating): | | | |
|   Entrance Surface | 2.158 | .074 | 720-293 |
|   Intermediate Surface | 1.212 | .127 | 523-586 |
|   Exit Surface | ∞ | (.500) | air |
| Prism (90° Collimating): | | | |
|   Entrance Surface | ∞ | .600 | 517-645 |
|   Exit Surface | ∞ | (2.030) | air |
| Lens (Doublet): | | | |
|   Entrance Surface | 2.158 | .074 | 720-293 |
|   Intermediate Surface | 1.212 | .127 | 523-586 |
|   Exit Surface | ∞ | Cemented to prism 47 | |
| Prism (90° Cemented to doublet): | | | |
|   Entrance Surface | ∞ | .800 | 523-586 |
|   Exit Surface | ∞ | (4.960) | air |
| Lens (Field Flattener): | | | |
|   Entrance Surface | −2.100 | .100 | 720-293 |
|   Exit Surface | 4.297 | (.005) | air |
| Tube Window (Image Converter): | | | |
|   Entrance Surface | 2.380 | .065 | 523-586 |
|   Exit Surface | 2.380 | | |

References Cited by the Examiner

UNITED STATES PATENTS

| | | | |
|---|---|---|---|
| 1,921,630 | 8/1933 | Mechau | 88—2.6 X |
| 2,492,353 | 12/1949 | Brackett | 88—72 |
| 2,753,760 | 7/1956 | Braymer | 88—1.5 X |
| 3,152,214 | 10/1964 | Korones et al. | 88—32 X |

FOREIGN PATENTS 362,153    8/1938    Italy.

OTHER REFERENCES

Kingslake: "The Development of the Zoom Lens," Journal of the SMPTE, vol. 69, pp. 534–544 (p. 535 relied on) August 1960.

JEWELL H. PEDERSEN, *Primary Examiner.*

L. ORLOFF, E. S. BAUER, *Assistant Examiners.*